United States Patent
Lee et al.

(10) Patent No.: US 8,930,316 B2
(45) Date of Patent: Jan. 6, 2015

(54) SYSTEM AND METHOD FOR PROVIDING PARTITION PERSISTENT STATE CONSISTENCY IN A DISTRIBUTED DATA GRID

(71) Applicant: Oracle International Corporation, Redwood Shores, CA (US)

(72) Inventors: Robert H. Lee, San Carlos, CA (US); Gene Gleyzer, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/671,376

(22) Filed: Nov. 7, 2012

(65) Prior Publication Data
US 2014/0108347 A1   Apr. 17, 2014

Related U.S. Application Data

(60) Provisional application No. 61/714,100, filed on Oct. 15, 2012.

(51) Int. Cl.
*G06F 17/30* (2006.01)
(52) U.S. Cl.
USPC .......................................... 707/644; 707/655
(58) Field of Classification Search
CPC ..................... G06F 17/30575; G06F 17/30584
USPC ................................................ 707/644, 655
See application file for complete search history.

(56) References Cited

U.S. PATENT DOCUMENTS

| | | | |
|---|---|---|---|
| 5,014,265 | A | 5/1991 | Hahne et al. |
| 5,301,350 | A | 4/1994 | Rogan et al. |
| 5,561,785 | A | 10/1996 | Blandy et al. |
| 5,784,698 | A | 7/1998 | Brady et al. |
| 6,070,202 | A | 5/2000 | Minkoff et al. |
| 6,338,112 | B1 | 1/2002 | Wipfel et al. |
| 6,826,597 | B1 | 11/2004 | Lonnroth et al. |
| 7,058,055 | B2 | 6/2006 | Mugica et al. |
| 7,139,925 | B2 | 11/2006 | Dinker et al. |
| 7,707,513 | B2 | 4/2010 | Broda et al. |
| 7,861,249 | B2 | 12/2010 | Jiang et al. |
| 8,024,445 | B2 | 9/2011 | Kamijima et al. |
| 8,122,006 | B2 | 2/2012 | de Castro et al. |
| 8,131,894 | B2 | 3/2012 | Cain et al. |
| 8,166,095 | B2 | 4/2012 | Ferwerda et al. |
| 8,249,072 | B2 | 8/2012 | Sugumar et al. |

(Continued)

OTHER PUBLICATIONS

Tanenbaum, Andrew S., "*Modern operating systems*" Prentice-Hall, Inc., Upper Saddle River, New Jersey, 2001. 5 pages.

(Continued)

*Primary Examiner* — Baoquoc N To
(74) *Attorney, Agent, or Firm* — Meyer IP Law Group

(57) ABSTRACT

A system and method can provide partition persistent state consistency in a distributed data grid. The distributed data grid can provide a plurality of copies of a partition on a plurality of cluster nodes in the distributed data grid, wherein the plurality of cluster nodes includes a primary owner node and one or more backup nodes for the partition. The primary owner node can propagate one or more modifications of the partition from the primary owner node to the one or more backup nodes. The distributed data grid can ensure consistency among the plurality copies of the partition on the plurality of cluster nodes in the distributed data grid.

20 Claims, 5 Drawing Sheets

(56) References Cited

U.S. PATENT DOCUMENTS

| | | |
|---|---|---|
| 8,271,980 B2 | 9/2012 | Jackson |
| 8,290,919 B1 | 10/2012 | Kelly et al. |
| 8,332,493 B2 | 12/2012 | Rowley et al. |
| 8,392,368 B1 | 3/2013 | Kelly et al. |
| 8,510,376 B2 | 8/2013 | Kaczmarski et al. |
| 8,612,386 B2 | 12/2013 | Tien et al. |
| 8,621,031 B2 | 12/2013 | Desai |
| 8,768,981 B1 | 7/2014 | Milne et al. |
| 2004/0010674 A1 | 1/2004 | Boyd et al. |
| 2004/0083317 A1 | 4/2004 | Dickson et al. |
| 2004/0172618 A1 | 9/2004 | Marvin |
| 2005/0249215 A1 | 11/2005 | Kelsey et al. |
| 2006/0026169 A1 | 2/2006 | Pasqua |
| 2006/0112174 A1 | 5/2006 | L'Heureux et al. |
| 2006/0129516 A1 | 6/2006 | Bradford et al. |
| 2006/0161893 A1 | 7/2006 | Han et al. |
| 2006/0230128 A1 | 10/2006 | Chung et al. |
| 2007/0168336 A1* | 7/2007 | Ransil et al. ............ 707/3 |
| 2008/0208960 A1 | 8/2008 | Rowley et al. |
| 2009/0077233 A1 | 3/2009 | Kurebayashi et al. |
| 2009/0116484 A1 | 5/2009 | Buford |
| 2009/0177914 A1 | 7/2009 | Winchell |
| 2010/0005472 A1 | 1/2010 | Krishnaraj et al. |
| 2010/0017461 A1 | 1/2010 | Kokkevis et al. |
| 2010/0037222 A1 | 2/2010 | Tatsubori et al. |
| 2010/0042755 A1 | 2/2010 | Fuente et al. |
| 2010/0060934 A1 | 3/2010 | Bellert |
| 2010/0125624 A1 | 5/2010 | Bachhuber-Haller et al. |
| 2010/0265945 A1 | 10/2010 | Bejerano et al. |
| 2010/0333099 A1 | 12/2010 | Kupferschmidt et al. |
| 2011/0004701 A1 | 1/2011 | Panda et al. |
| 2011/0055322 A1 | 3/2011 | Gregerson |
| 2011/0137991 A1 | 6/2011 | Russell |
| 2011/0225120 A1 | 9/2011 | Cooper et al. |
| 2011/0225121 A1 | 9/2011 | Cooper et al. |
| 2011/0225122 A1* | 9/2011 | Denuit et al. ............ 707/634 |
| 2011/0246550 A1 | 10/2011 | Levari et al. |
| 2012/0113896 A1 | 5/2012 | Karol |
| 2012/0144025 A1 | 6/2012 | Melander et al. |
| 2012/0197840 A1 | 8/2012 | Oliver et al. |
| 2012/0197959 A1 | 8/2012 | Oliver et al. |
| 2012/0198455 A1 | 8/2012 | Lee et al. |
| 2012/0278398 A1 | 11/2012 | Lowekamp |
| 2012/0331029 A1* | 12/2012 | King et al. ............ 709/201 |
| 2013/0014114 A1 | 1/2013 | Nagata |
| 2013/0041969 A1 | 2/2013 | Falco et al. |
| 2013/0073809 A1 | 3/2013 | Antani et al. |
| 2013/0074101 A1 | 3/2013 | Oliver et al. |
| 2013/0103837 A1 | 4/2013 | Krueger |
| 2013/0128726 A1 | 5/2013 | Hellhake et al. |
| 2013/0262632 A1 | 10/2013 | Fein et al. |
| 2013/0325543 A1 | 12/2013 | Magee et al. |
| 2014/0016457 A1 | 1/2014 | Enyedi et al. |
| 2014/0219209 A1 | 8/2014 | Soneda et al. |

OTHER PUBLICATIONS

Andrew S. Tanenbaum, Computer Networks: Fourth Edition, Prentice Hall PTR, Upper Saddle River, NJ (2003), 6 pages.
Martin Sustrik, [zeromq-dev] Subports, Grokbase, Jul. 2011, 6 pages <http://grokbase.com/t/zeromq/zeromq-dev/117vwvr6z9/subports>.
Class Socketchannel, Java™ 2 Platform Standard Ed. 5.0, Copyright © 2004, 2010 Oracle Int'l Corp., 12 pages. <http://docs.oracle.com/javase/1.5.0/docs/api/java/nio/channels/SocketChannel.html>.
Tanenbaum, Andrew S., Computer Networks, Fourth Edition, 2003, Prentice Hall PTR, Chapter 5.2.7 Broadcast Routing.

* cited by examiner

SYSTEM AND METHOD FOR PROVIDING PARTITION PERSISTENT STATE CONSISTENCY IN A DISTRIBUTED DATA GRID

CLAIM OF PRIORITY

This application claims priority on U.S. Provisional Patent Application No. 61/714,100, entitled "SYSTEM AND METHOD FOR SUPPORTING A DISTRIBUTED DATA GRID IN A MIDDLEWARE ENVIRONMENT," by inventors Robert H. Lee, Gene Gleyzer, Charlie Helin, Mark Falco, Ballav Bihani and Jason Howes, filed Oct. 15, 2012, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCED APPLICATIONS

The current application hereby incorporates by reference the material in the following patent applications:

U.S. patent application No. 61/714,100, entitled "SYSTEM AND METHOD FOR PROVIDING SUPPORTING GUARANTEED MULTI-POINT DELIVERY IN A DISTRIBUTED DATA GRID," by inventors Robert H. Lee and Gene Gleyzer, filed Oct. 15, 2012.

U.S. patent application Ser.No. 13/671,408, entitled "SYSTEM AND METHOD FOR PROVIDING TRANSIENT PARTITION CONSISTENCY IN A DISTRIBUTED DATA GRID," by inventors Robert H. Lee and Gene Gleyzer, filed Nov. 7, 2012.

U.S. patent application Ser. No. 13/671,395, entitled "SYSTEM AND METHOD FOR SUPPORTING ASYNCHRONOUS MESSAGE PROCESSING IN A DISTRIBUTED DATA GRID," by inventor Gene Gleyzer, filed Nov. 7, 2012.

U.S. patent application Ser. No. 13/671,481, entitled "SYSTEM AND METHOD FOR SUPPORTING OUT-OF-ORDER MESSAGE PROCESSING IN A DISTRIBUTED DATA GRID," by inventors Mark Falco and Gene Gleyzer, filed Nov. 7, 2012.

FIELD OF INVENTION

The present invention is generally related to computer systems, and is particularly related to a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein are systems and methods that can provide partition persistent state consistency in a distributed data grid. The distributed data grid can provide a plurality of copies of a partition on a plurality of cluster nodes in the distributed data grid, wherein the plurality of cluster nodes includes a primary owner node and one or more backup nodes for the partition. The primary owner node can propagate one or more modifications of the partition from the primary owner node to the one or more backup nodes. The distributed data grid can ensure consistency among the plurality copies of the partition on the plurality of cluster nodes in the distributed data grid.

DETAILED DESCRIPTION

Figure 1:
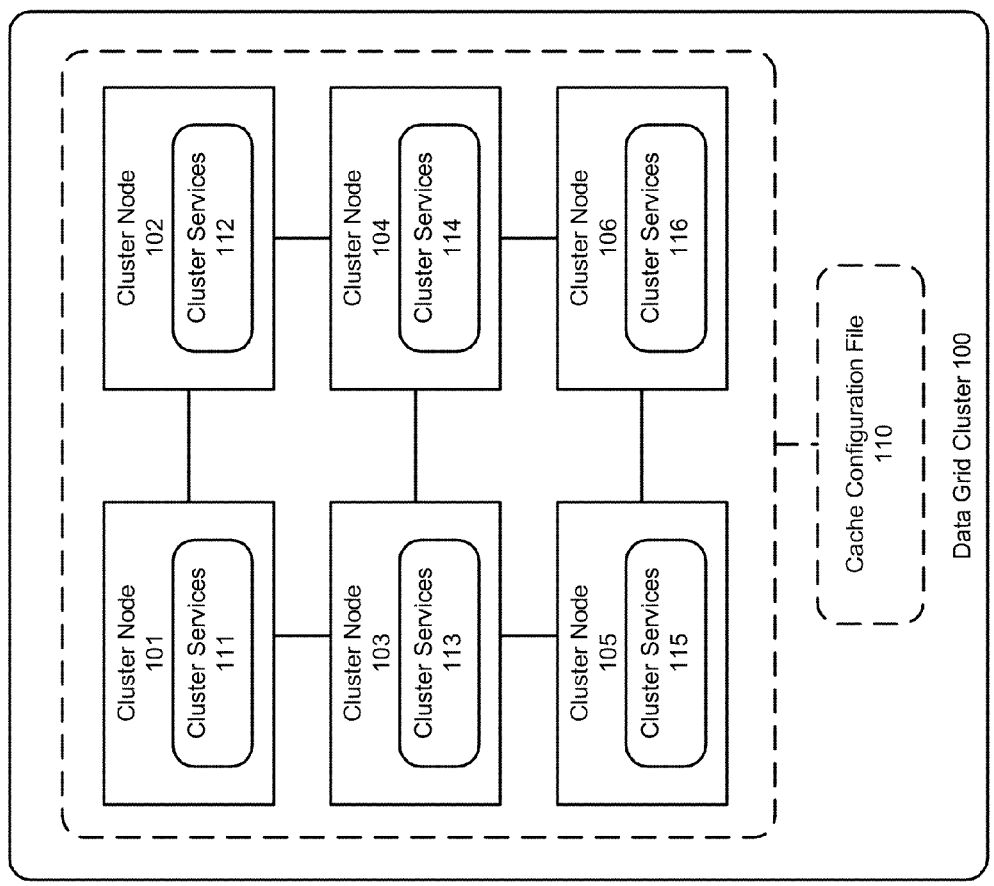
FIG. 1 is an illustration of a data grid cluster in accordance with various embodiments of the invention.

Described herein is a system and method that can provide partition persistent state consistency in a distributed data grid.

In accordance with an embodiment, as referred to herein a "distributed data grid", "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

FIG. 1 is an illustration of a data grid cluster in accordance with various embodiments of the invention. As shown in FIG. 1, a data grid cluster 100, e.g. an Oracle Coherence data grid, includes a plurality of cluster nodes 101-106 having various cluster services 111-116 running thereon. Additionally, a cache configuration file 110 can be used to configure the data grid cluster 100.

Partition Persistent State Consistency

In accordance with an embodiment of the invention, partition persistent state consistency can be supported in the distributed data grid. The partition persistent state consistency can be beneficial in enabling various protocols in the distributed data grid, such as the partition backup protocol, the partition transfer protocol, and the partition ownership change protocol.

Figure 2:
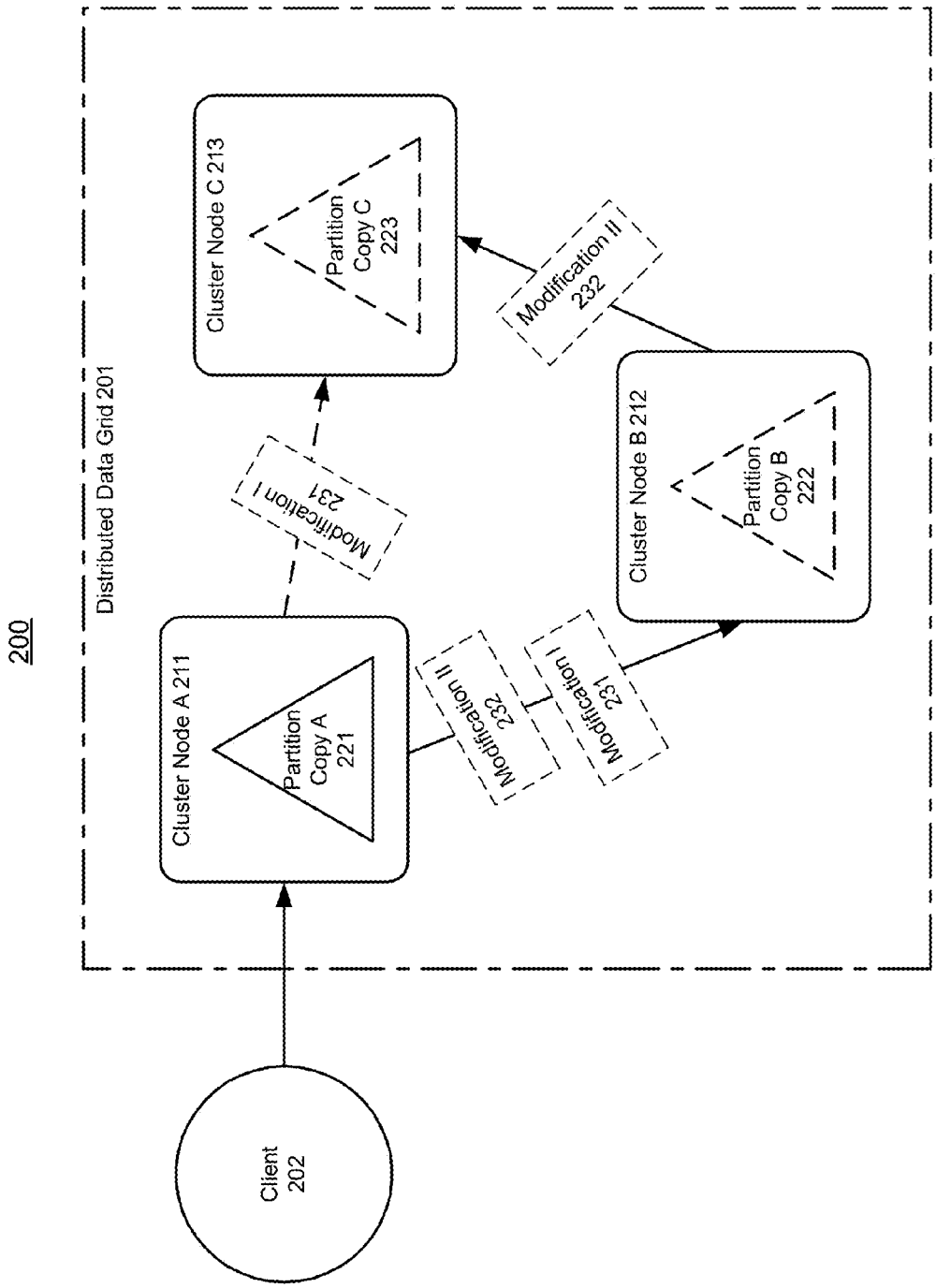
FIG. 2 shows an illustration of providing partition persistent state consistency in a distributed data grid in accordance with an embodiment of the invention.

FIG. 2 shows an illustration of providing partition persistent state consistency in a distributed data grid in accordance with an embodiment of the invention. As shown in FIG. 2, a distributed data grid 201 can comprise a plurality of cluster nodes, e.g. the cluster nodes A-C 211-213, that maintains different partitions. Each Partition in the distributed data grid 201 can hold various software objects in a middleware environment 200. Furthermore, each partition can be stored in multiple copies in the distributed data grid 201, e.g. the partition copies A-C 221-223 on different cluster nodes A-C 211-213 for a partition.

In accordance with an embodiment of the invention, one cluster node in the distributed data grid 201 can be the primary owner node of the partition, while the other cluster nodes serve as the backup nodes for the primary owner node. The primary owner node A 211 can manage the state of the partition, such as controlling the partition version and propagating one or more modifications and/or updates, e.g. the modifications I-II 231-232, to the various backup nodes B-C 212-213. Furthermore, each partition copy A-C 221-223 can be maintained in different versions depending on whether or not a modification, e.g. a modification I 231 or II 232, has been applied on a particular copy of the partition 221-223.

In this example, the partition copy A 221 can be maintained on the cluster node A 211, which is the primary owner node of the partition. The cluster node B 212, which maintains a partition copy B 222, and the cluster node C 213, which maintains a partition copy C 223, are both the backup nodes. A client 202 can interact with the cluster node A 211, such as performing one or more data grid operations that update or modify the partition copy A 221.

The distributed data grid 201 can ensure that the consistency among the different copies of the partition 221-223 stored on the plurality of cluster nodes A-C 211-213 by ensuring that the various modifictions I-II 431-432 are applied on each copy of the partition A-C 221-223 according to an order. Furthermore, the distributed data grid 201 can propagate the different modifications from the primary owner node A 211 to the backup nodes B-C 212-213, e.g. using backup messages. As shown in FIG. 2, the primary owner node A 211 can initiate one or more modifications, e.g. modifications I 231 and II 232, based on one or more messages received from a client 202.

In accordance with an embodiment of the invention, the distributed data grid 201 is based on a peer-to-peer architecture. The underlying message transport layer can guarantee an orderly delivery of one or more messages over a connection between each pair of directly-connected cluster nodes in the distributed data grid. For example, the backup messages, containing either modification I 231 or II 232, can be delivered orderly over the connection between the cluster node A 211 and the cluster node B 212.

On the other hand, under the peer-to-peer architecture, messages sending from a source cluster node to a destination cluster node within a distributed data grid 201 can be delivered via different routs. As shown in FIG. 2, the cluster node A 211 can either deliver a backup message directly to the cluster node C 213, or via the cluster node B 213. Furthermore, the delivery routs may become more complex and less predictable when more cluster nodes are involved.

Thus, the delivery of the backup messages containing various modifications can be out-of-order within the distributed data grid 201. For example, the cluster node 213 can receive a backup message containing modification I 231 after receiving another backup message containing modification II 232, even though the message transport protocol can ensure that the modification I 231 arrives at the cluster node B 212 before the modification II 232.

As shown in FIG. 2, after the cluster node C 213 receives the modification II 232, the cluster node C 213 can determine whether it has already applied the modification I 231 to the partition copy C 223. The cluster node C 213 can defer applying the modification II 232 on the partition copy C 223 until the modification I 231 is received and applied on the partition copy C 223.

In accordance with an embodiment of the invention, partition persistent state information, such as a partition version number, can be assigned to each partition copy A-C 221-223 to ensure the consistency among the different partition copies A-C 221-223 in the distributed data grid 201. In the above example, the cluster node C 213 can check the partition version number for the partition copy C 213 to easily find out whether the partition copy C 223 has been updated with modification I 231.

Furthermore, the distributed data grid 201 allows the primary owner node A 211 to resend one or more modifications to a backup node after receiving a special message from the backup node. For example, this special message can be either an empty message or a message containing the latest modification received at the backup node.

Figure 3:
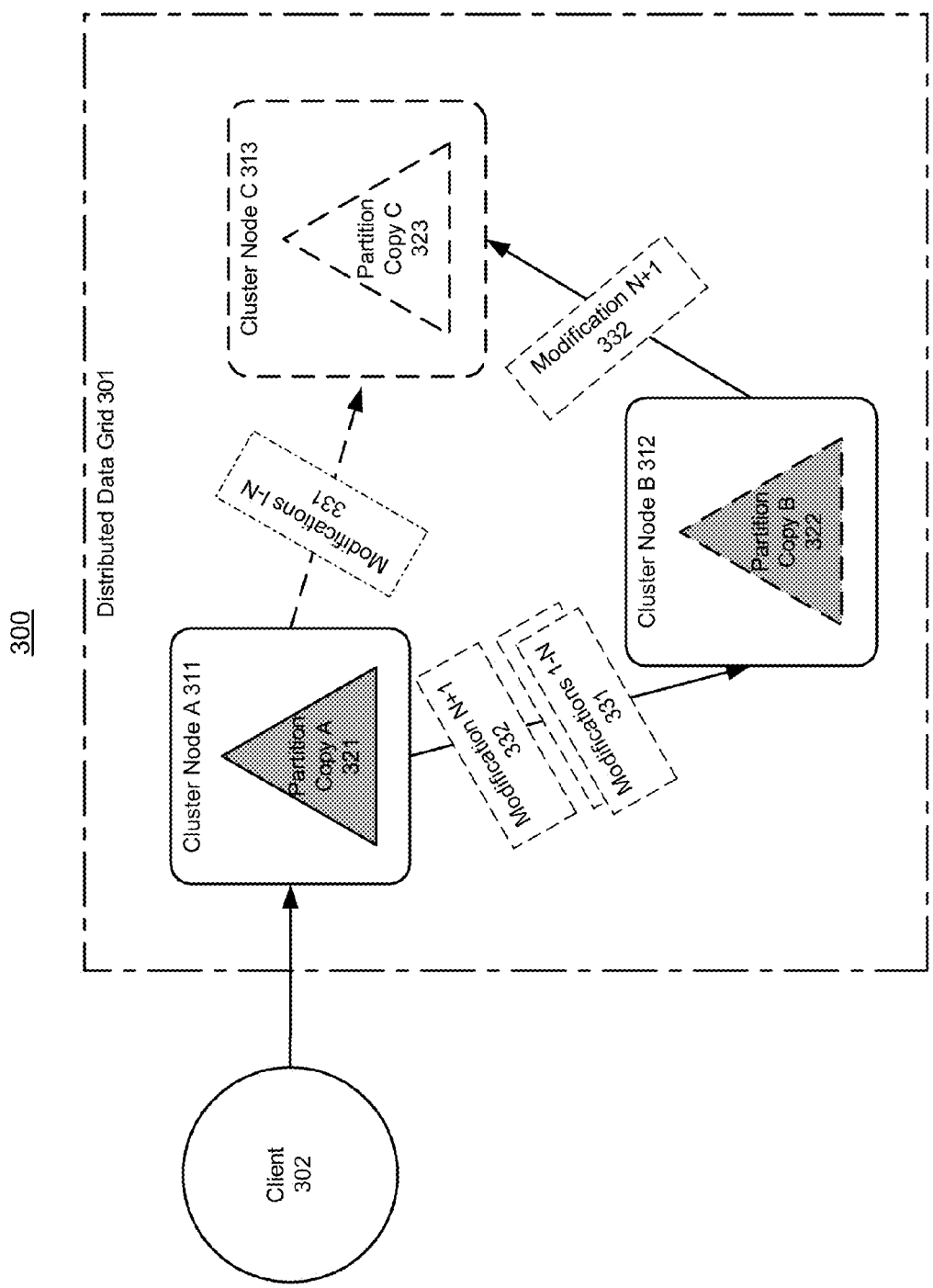
FIG. 3 shows an illustration of supporting partition persistent state consistency in a distributed data grid when adding a new backup node in accordance with an embodiment of the invention.

FIG. 3 shows an illustration of supporting partition persistent state consistency in a distributed data grid when adding a new backup node in accordance with an embodiment of the invention. As shown in FIG. 3, a partition can be stored initially in a plurality of cluster nodes in a distributed data grid 301, e.g. cluster nodes A-B 311-312. The cluster node A 311, which maintains partition copy A 321, is the primary owner node and the cluster node B 312, which maintains partition copy B 322, is a backup node. The primary owner node A 311 can propagate a series of modifications, e.g. modifications 1-N 331, to the backup node B 322, after receiving one or more messages from a client 302 in a middleware environment 300.

Then, a cluster node C 313 in the distributed data grid 301, which maintains an additional partition copy C 323 for the partition, can be added and become a new backup node. In order to quickly configure the newly added backup node C 313, the primary owner node A 311 can send a batch of modifications, e.g. the modifications 1-N 331, directly to the newly added backup node C 313, in order to update the partition copy C 323 maintained in the newly added backup node C 313.

In the meantime, the cluster node B 312 can send a backup message that contains a new modification N+1 332, which is received from the primary owner node A 311, to the cluster node C 313. In such a scenario, the batch of modifications 1-N 331 may not always arrive at the newly added backup node C 313 before the new modification N+1 332.

In order to ensure consistency, after receiving new modification N+1 332, the cluster node C 313 can check whether it has received and applied the batch of modifications 1-N 331, e.g. via checking the partition version number associated with the partition copy C 323. Then, the cluster node C 313 can apply the new modification N+1 332.

Figure 4:
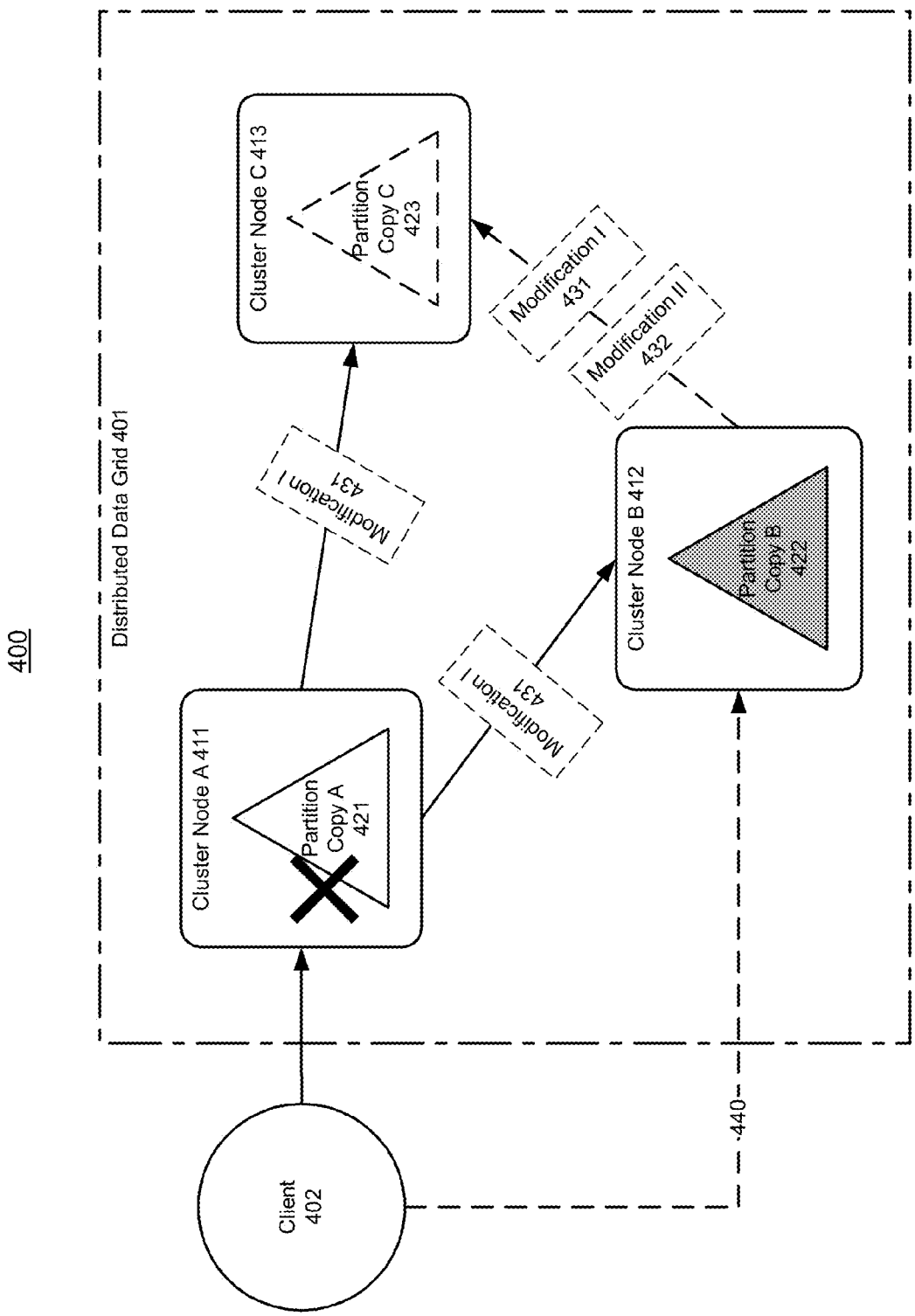
FIG. 4 shows an illustration of supporting partition persistent state consistency in a distributed data grid when replacing a primary owner cluster node in accordance with an embodiment of the invention.

FIG. 4 shows an illustration of supporting partition persistent state consistency in a distributed data grid when replacing a primary owner cluster node in accordance with an embodiment of the invention. As shown in FIG. 4, a distributed data grid 401 can store a partition initially in cluster nodes A-C 411-413, with the cluster node A 411 maintaining a partition copy A 421 being the primary owner node and the cluster nodes B-C 412-413 maintaining partition copies B-C 422-423 being the backup nodes. The primary owner cluster node A 411 can propagate a backup message containing modification I 431 to the backup nodes B-C 412-413, after receiving one or more messages from a client 402 in a middleware environment 400.

Within the distributed data grid 401, the primary owner node A 411 may die at any time and/or be replaced by a new primary owner cluster node, e.g. cluster node B 412. The client 402 may be reconnected to the new primary owner cluster node B 412 via a new connection 440. With or without a request from the client 402, the new primary owner cluster node B 412 may resend at least one said modification, e.g. modification I 431, to the backup node C 413 which maintains a partition copy C 423, in addition to a new modification II 432.

In the example as shown in FIG. 4, the cluster node C 413 may receive a same modification, e.g. the modification I 431, for multiple times. In order to ensure consistency, after receiving backup messages from cluster node B 412, the cluster node C 413 can check whether it has received and applied the batch of modifications I 431, e.g. via checking the partition version number associated with the partition copy C 423. Then, the cluster node C 413 can update the partition copy C 423 accordingly.

Figure 5:
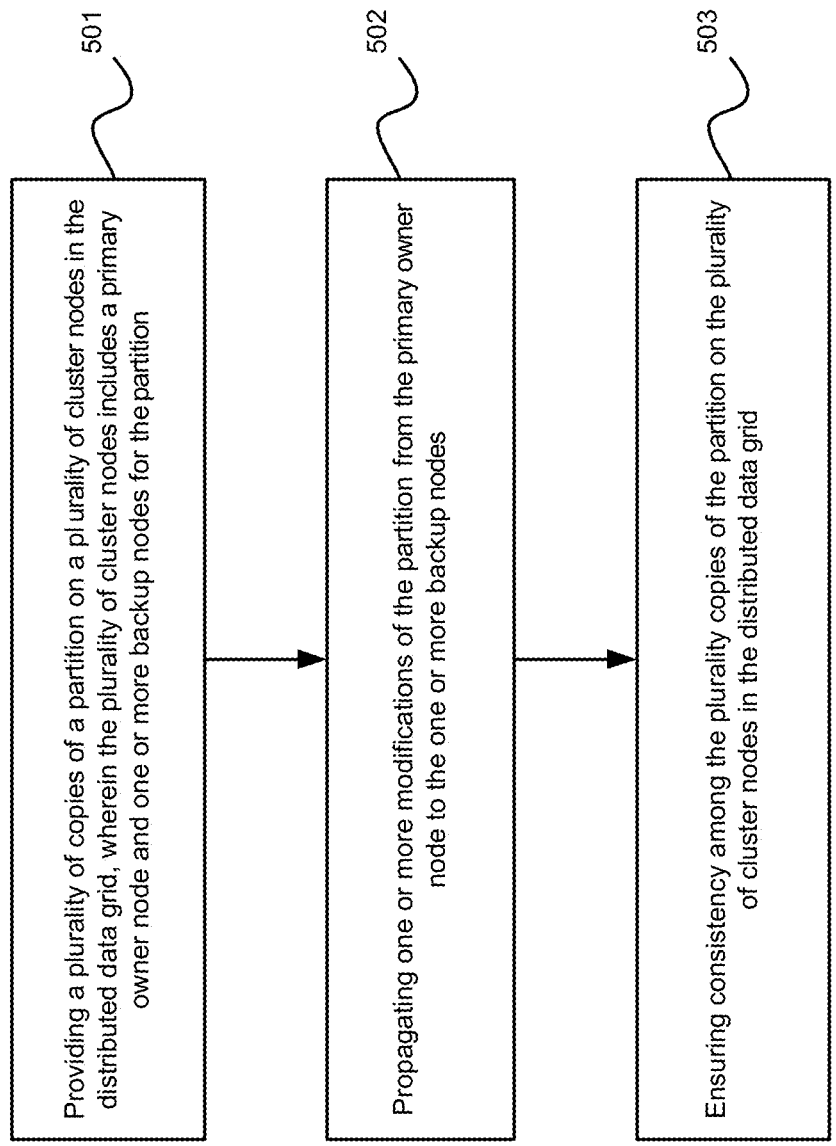
FIG. 5 illustrates an exemplary flow chart for providing partition persistent state consistency in a distributed data grid in accordance with an embodiment of the invention.

FIG. 5 illustrates an exemplary flow chart for providing partition persistent state consistency in a distributed data grid in accordance with an embodiment of the invention. As shown in FIG. 5, at step 501, the distributed data grid provides a plurality of cluster nodes that stores a plurality of copies of a partition, wherein the plurality of cluster nodes includes a primary owner node and one or more backup nodes for the partition. Then, at step 502, the distributed data grid can propagate one or more modifications of the partition from the primary owner node to the one or more backup nodes. Furthermore, at step 503, the distributed data grid can ensure consistency among the plurality copies of the partition on the plurality of cluster nodes in the distributed data grid.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for providing partition persistent state consistency in a distributed data grid, comprising:
   providing a primary copy of a partition on a first node in the distributed data grid, wherein the primary copy of the partion is associated with a primary copy version number;
   providing a backup copy of the partition on a second node in the distributed data grid, wherein the backup copy of the partition is associated with a backup copy version number;
   making a first modification to the primary copy of the partition;
   propagating the first modification from the first node to the second node by transmitting a first message containing said first modification from the first node to the second node;
   making a second modification to the primary copy of the partition;
   propagating the second modification from the first node to the second node by transmitting a second message containing said second modification from the first node to the second node;
   receiving the second message at the second node;

determining at the second node whether the first modification has been applied to the backup copy of the partition by checking the backup copy version number; and deferring applying the second modification on the backup copy of the partition until the first modification is received and applied as indicated by checking the backup copy version number.

2. The method according to claim 1, further comprising:
receiving the first message at the second node;
applying the first modification on the backup copy of the partition; and
applying the second modification on the backup copy of the partition after the first modification has been received and applied as indicated by checking the backup copy version number.

3. The method according to claim 1, further comprising:
retransmitting the second message containing said second modification from the first node to the second node in response to a special message sent from the second node to the first node.

4. The method according to claim 1, further comprising:
sending a special message from the second node to the first node wherein the special message contains the last modification received by the second node;
receiving the special message at the first node;
retransmitting the second message containing said second modification from the first node to the second node in response to the special message.

5. The method according to claim 1, further comprising:
sending an empty message from the second node to the first node;
receiving the empty message at the first node;
retransmitting the second message containing said second modification from the first node to the second node in response to the empty message.

6. The method according to claim 4, further comprising:
providing another backup copy of the partition on a third node in the distributed data grid, wherein the another backup copy of the partition is associated with another backup copy version number;
propagating the first modification from the first node to the third node by transmitting another first message containing said first modification from the first node to the third node;
propagating the second modification from the first node to the third node by transmitting another second message containing said second modification from the first node to the third node;
receiving the another second message at the third node;
determining at the third node whether the first modification has been applied to the another backup copy of the partition by checking the another backup copy version number; and
deferring applying the second modification on the another backup copy of the partition until the first modification is received and applied as indicated by checking the another backup copy version number.

7. The method according to claim 1, further comprising:
providing a new backup copy of the partition on a third node in the distributed data grid, wherein the new backup copy of the partition is associated with a new backup copy version number;
sending a batch of modifications made prior to the second modification to the third node in order to update the new backup copy of the partition on the third node; and propagating the second modification from the first node to the third node by transmitting another second message containing said second modification from the first node to the third node;
receiving the another second message at the third node;
determining at the third node whether the batch of modifications has been applied to the new backup copy of the partition by checking the new backup copy version number; and
deferring applying the second modification on the new backup copy of the partition until the batch of modifications is received and applied as indicated by checking the new backup copy version number.

8. The method according to claim 1, further comprising:
upon failure of the first node, replacing the first node with a new first node; and
repropagating at least one modification from the new first node to the second node.

9. The method according to claim 1, further comprising:
allowing the first node to manage a state of the partition.

10. The method according to claim 1, further comprising:
supporting a partition ownership change protocol, a partition backup protocol, and a partition transfer protocol in the distributed data grid.

11. A system which provides partition persistent state consistency in a distributed data grid, the system comprising:
one or more microprocessors;
a first node and a second node in the distributed data grid operating on said one or more microprocessors;
a primary copy of a partition on the first node in the distributed data grid, wherein the primary copy of the partition is associated with a primary copy version number;
a backup copy of the partition on the second node in the distributed data grid, wherein the backup copy of the partition is associated with a backup copy version number;
wherein the first node is configured to,
    make a first modification to the primary copy of the partition,
    propagate the first modification from the first node to the second node by transmitting a first message containing said first modification from the first node to the second node,
    make a second modification to the primary copy of the partition, and
    propagate the second modification from the first node to the second node by transmitting a second message containing said second modification from the first node to the second node; and
wherein the second node is configured to,
    receive the second message,
    determine whether the first modification has been applied to the backup copy of the partition by checking the backup copy version number, and
    defer applying the second modification on the backup copy of the partition until the first modification is received and applied as indicated by checking the backup copy version number.

12. The system according to claim 11, wherein the second node is further configured to:
receive the first message at the second node;
apply the first modification on the backup copy of the partition; and
apply the second modification on the backup copy of the partition after the first modification has been received and applied as indicated by checking the backup copy version number.

13. The system according to claim 11, wherein the first node is futher configured to:
  retransmit the second message containing said second modification from the first node to the second node in response to a special message sent from the second node to the first node.

14. The system according to claim 11, wherein:
  the second node is configured to send a special message from the second node to the first node wherein the special message contains the last modification received by the second node; and
  the first node is configured to receive the special message, and retransmit the second message containing said second modification from the first node to the second node in response to the special message.

15. The system according to claim 11, wherein:
  the second node is configured to send an empty message from the second node to the first node; and
  the first node is configured to receive the empty message, and retransmit the second message containing said second modification from the first node to the second node in response to the empty message.

16. The system according to claim 11, further comprising:
  a third node in the distributed data grid;
  another backup copy of the partition on the third node in the distributed data grid, wherein the another backup copy of the partition is associated with another backup copy version number;
  wherein the first node is configured to,
    propagate the first modification from the first node to the third node by transmitting a another first message containing said first modification from the first node to the third node,
    propagate the second modification from the first node to the third node by transmitting another second message containing said second modification from the first node to the third; and
  wherein the third node is configured to,
    receive the another second message,
    determine whether the first modification has been applied to the another backup copy of the partition by checking the another backup copy version number, and
    defer applying the second modification on the another backup copy of the partition until the first modification is received and applied as indicated by checking the another backup copy version number.

17. The system according to claim 11, further comprising:
  a third node in the distributed data grid;
  a new backup copy of the partition on the third node in the distributed data grid, wherein the new backup copy of the partition is associated with a new backup copy version number;
  wherein the first node is further configured to,
    send a batch of modifications made prior to the second modification to the third node in order to update the new backup copy of the partition on the third node, and
    propagate the second modification from the first node to the third node by transmitting another second message containing said second modification from the first node to the third node; and
  wherein the third node is configured to,
    receive the another second message,
    determine whether the batch of modifications has been applied to the new backup copy of the partition by checking the new backup copy version number, and
    defer applying the second modification on the new backup copy of the partition until the batch of modifications is received and applied as indicated by checking the new backup copy version number.

18. The system according to claim 11, further comprising a partition ownership change protocol, a partition backup protocol, and a partition transfer protocol in the distributed data grid.

19. The system according to claim 11, wherein the first node manages a state of the partition.

20. A non-transitory machine readable storage medium having instructions stored thereon for providing partition persistent state consistency in a distributed data grid, which instructions, when executed cause a system to perform steps comprising:
  providing a primary copy of a partition on a first node in the distributed data grid, wherein the primary copy of the partion is associated with a primary copy version number;
  providing a backup copy of the partition on a second node in the distributed data grid, wherein the backup copy of the partition is associated with a backup copy version number;
  making a first modification to the primary copy of the partition;
  propagating the first modification from the first node to the second node by transmitting a first message containing said first modification from the first node to the second node;
  making a second modification to the primary copy of the partition;
  propagating the second modification from the first node to the second node by transmitting a second message containing said second modification from the first node to the second node;
  receiving the second message at the second node;
  determining at the second node whether the first modification has been applied to the backup copy of the partition by checking the backup copy version number; and
  deferring applying the second modification on the backup copy of the partition until the first modification is received and applied as indicated by checking the backup copy version number.

* * * * *

UNITED STATES PATENT AND TRADEMARK OFFICE
CERTIFICATE OF CORRECTION

PATENT NO. : 8,930,316 B2
APPLICATION NO. : 13/671376
DATED : January 6, 2015
INVENTOR(S) : Lee et al.

It is certified that error appears in the above-identified patent and that said Letters Patent is hereby corrected as shown below:

In the Drawings:

On sheet 3 of 5, in figure 3, before 331, delete "I-N" and insert -- 1-N --, therefor.

On sheet 5 of 5, in figure 5, under Reference Numeral 501, line 1, delete "pl urality" and insert -- plurality --, therefor.

In the Specification:

In column 4, line 9, delete "modifictions" and insert -- modifications --, therefor.

In column 4, line 30, delete "routs." and insert -- routes. --, therefor.

In column 4, line 33, delete "routs" and insert -- routes --, therefor.

In the Claims:

In column 6, line 49, in Claim 1, delete "partion" and insert -- partition --, therefor.

In column 8, lines 31-32, in Claim 11, delete "partion" and insert -- partition --, therefor.

In column 9, line 2, in Claim 13, delete "futher" and insert -- further --, therefor.

In column 10, line 30, in Claim 20, delete "partion" and insert -- partition --, therefor.

Signed and Sealed this
First Day of September, 2015

Michelle K. Lee
*Director of the United States Patent and Trademark Office*